(12) United States Patent  
Yamauchi et al.

(10) Patent No.: US 12,360,035 B2  
(45) Date of Patent: Jul. 15, 2025

(54) INFORMATION PROCESSING APPARATUS, PARTICLE ANALYSIS APPARATUS, PARTICLE FRACTIONATION APPARATUS, AND INFORMATION PROCESSING METHOD

(71) Applicant: Sony Group Corporation, Tokyo (JP)

(72) Inventors: Yasuharu Yamauchi, Tokyo (JP); Koji Futamura, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 202 days.

(21) Appl. No.: 18/029,879

(22) PCT Filed: Sep. 2, 2021

(86) PCT No.: PCT/JP2021/032342  
§ 371 (c)(1),  
(2) Date: Mar. 31, 2023

(87) PCT Pub. No.: WO2022/080034  
PCT Pub. Date: Apr. 21, 2022

(65) Prior Publication Data  
US 2023/0366803 A1   Nov. 16, 2023

(30) Foreign Application Priority Data  
Oct. 12, 2020  (JP) ................. 2020-172052

(51) Int. Cl.  
*G01N 15/1429* (2024.01)  
*G01N 15/14* (2006.01)

(52) U.S. Cl.  
CPC .............. *G01N 15/1429* (2013.01); *G01N 2015/1402* (2013.01)

(58) Field of Classification Search  
CPC ........... G01N 15/1429; G01N 15/1402; G01N 15/01; G01N 15/147; G01N 15/1492;  
(Continued)

(56) References Cited

U.S. PATENT DOCUMENTS 6,377,753 B1 * 4/2002 Matsumoto ............ G03B 13/36  
                                                 396/109  
7,262,425 B2 * 8/2007 Nishiyama ........... G01N 21/956  
                                                 250/559.4  
(Continued)

FOREIGN PATENT DOCUMENTS

| JP | 2003-083894 A | 3/2003 |
| JP | 2004-205508 A | 7/2004 |

(Continued)

OTHER PUBLICATIONS

International Search Report and English translation thereof mailed Nov. 9, 2021 in connection with International Application No. PCT/JP2021/032342.

*Primary Examiner* — Dominic E Hawkins  
(74) *Attorney, Agent, or Firm* — Wolf, Greenfield & Sacks, P.C.

(57) ABSTRACT

A technology is provided to improve reliability of data analysis.

The technology provides, among others, an information processing apparatus including a storage section configured to store event data including light intensity data obtained by irradiating light to one of multiple particles, and a processing section configured to process multiple event data items acquired from the multiple particles. The storage section stores a flag to be given to the light intensity data in a case where the light intensity data exceeds a threshold value. In accordance with an instruction to exclude the flagged light intensity data, the processing section processes the multiple event data items other than the flagged light intensity data.

17 Claims, 9 Drawing Sheets

(58) Field of Classification Search
CPC .............. G01N 2015/1481; G01N 2015/1493; G01N 2015/1497; G01N 2015/1006
See application file for complete search history.

(56) References Cited

U.S. PATENT DOCUMENTS

| | | |
|---|---|---|
| 2004/0119974 A1 | 6/2004 | Bishop et al. |
| 2009/0026354 A1* | 1/2009 | Nakajima ............. G01N 21/534 250/216 |
| 2010/0080440 A1* | 4/2010 | Yamada ........... G01N 35/00871 382/133 |
| 2011/0196637 A1 | 8/2011 | Sharpe et al. |
| 2012/0309039 A1 | 12/2012 | Atapattu et al. |
| 2014/0374622 A1 | 12/2014 | Cronin et al. |
| 2015/0268244 A1 | 9/2015 | Cho et al. |
| 2018/0122060 A1* | 5/2018 | Shirkhodaie .......... G06T 7/0008 |
| 2019/0118624 A1* | 4/2019 | Chu ....................... G02F 1/153 |
| 2019/0137383 A1* | 5/2019 | Umetsu .............. G01N 15/1459 |

FOREIGN PATENT DOCUMENTS

| | | |
|---|---|---|
| JP | 2011-232259 A | 11/2011 |
| JP | 2014-518376 A | 7/2014 |
| JP | 2015-508494 A | 3/2015 |
| JP | 2019-020421 A | 2/2019 |
| WO | WO 2017/191699 A1 | 11/2017 |
| WO | WO 2020/100667 A1 | 5/2020 |

* cited by examiner

INFORMATION PROCESSING APPARATUS, PARTICLE ANALYSIS APPARATUS, PARTICLE FRACTIONATION APPARATUS, AND INFORMATION PROCESSING METHOD

CROSS REFERENCE TO RELATED APPLICATIONS

This is a U.S. National Stage Application under 35 U.S.C. §371, based on International Application No. PCT/JP2021/032342, filed Sep. 2, 2021, which claims priority to Japanese Patent Application JP 2020-172052, filed Oct. 12, 2020, each of which is hereby incorporated by reference in its entirety.

TECHNICAL FIELD

The present technology relates to an information processing apparatus, a particle analysis apparatus, a particle fractionation apparatus, and an information processing method. More particularly, the technology relates to an information processing apparatus, a particle analysis apparatus, a particle fractionation apparatus, and an information processing method for improving reliability of data analysis.

BACKGROUND ART

In the past, there have been used apparatuses (e.g., flow cytometers) that label particles such as cells using a fluorescent dye, irradiate a laser beam to the labeled particles, and detect fluorescent or scattered light from the irradiated particles so as to measure diverse properties of the particles. In such apparatuses, the light reaching a light detector is converted to electrical signals (voltage pulses) and digitized. Statistical analysis or the like is then performed on the numerical data under various parameters.

In recent years, multicolor measurement has been practiced that involves labeling particles with multiple fluorescent dyes and employing multiple light detectors having different received wavelength bands so as to detect light emanating from the different fluorescent dyes. In such multicolor measurement, each light detector may receive fluorescence leaked from an unintended fluorescent dye. To cope with this problem, fluorescence compensation is performed in which fluorescence intensity equivalent to the leakage is subtracted from the fluorescence intensity measured by each light detector for improving the reliability of data analysis. The fluorescence compensation involves applying electrical or mathematical correction to pulses on a dedicated circuit so that the fluorescence intensity measured by the light detector becomes the true fluorescence intensity coming from the intended fluorescent dye.

For example, PTL 1 discloses a method in which the fluorescence intensity measured by each light detector is represented as a vector to which is applied an inverse matrix of a predetermined leakage matrix in order to calculate the true fluorescence intensity of the intended fluorescent dye.

Meanwhile, PTL 2 discloses a method in which the measured spectrum is approximated using a linear sum of simple stain spectra without recourse to the inverse matrix of a predetermined leakage matrix in order to calculate the true fluorescence intensity from each fluorescent dye.

CITATION LIST

Patent Literature

[PTL 1]
Japanese Patent Laid-Open No. 2003-83894
[PTL 2]
Japanese Patent Laid-Open No. 2011-232259

SUMMARY

Technical Problem

With the existing apparatuses, however, when signals from light detectors are converted from analog to digital form, there may be a light detector of which the detection limit is exceeded by high signal levels. In such a case, not only the data of the input signal to that light detector cannot be obtained accurately, but also the signals acquired by the other light detectors through the fluorescence compensation process are affected. This can become a problematic factor that degrades the reliability of the measured data as a whole. Also in such a case, gains need to be adjusted for measurement purposes at a stage of data measurement. At the stage of data analysis, too, gates need to be provided such that they exclude maximum-value data from the measured data plotted on each parameter axis.

It is therefore a main object of the present technology to provide techniques for improving the reliability of data analysis.

Solution to Problem

According to the present technology, there is provided an information processing apparatus including a storage section configured to store event data including light intensity data obtained by irradiating light to one of multiple particles, and a processing section configured to process multiple event data items acquired from the multiple particles. The storage section stores a flag to be given to the light intensity data in a case where the light intensity data exceeds a threshold value. In accordance with an instruction to exclude the flagged light intensity data, the processing section processes the multiple event data items other than the flagged light intensity data.

According to the present technology, there is also provided a particle analysis apparatus including a light irradiation section configured to irradiate light to one of multiple particles, a light detection section configured to detect light from the particle, a storage section configured to store event data including light intensity data obtained from the light detection section, and a processing section configured to process multiple event data items acquired from the multiple particles. The storage section stores a flag to be given to the light intensity data in a case where the light intensity data exceeds a threshold value. In accordance with an instruction to exclude the flagged light intensity data, the processing section processes the multiple event data items other than the flagged light intensity data.

According to the present technology, there is further provided a particle fractionation apparatus including a light irradiation section configured to irradiate light to one of multiple particles, a light detection section configured to detect light from the particle, a storage section configured to store event data including light intensity data obtained from the light detection section, and a processing section configured to process multiple event data items acquired from the multiple particles. The storage section stores a flag to be given to the light intensity data in a case where the light intensity data exceeds a threshold value. In accordance with an instruction to exclude the flagged light intensity data, the processing section processes the multiple event data items other than the flagged light intensity data. A fractionation section is further included to fractionate, in accordance with the instruction to exclude the flagged light intensity data, the particle associated with the multiple event data items other than the event data including the light intensity data.

According to the present technology, there is additionally provided an information processing method including a step of storing event data including light intensity data obtained by irradiating light to one of multiple particles, and a step of processing multiple event data items acquired from the multiple particles. The storing step stores a flag to be given to the light intensity data in a case where the light intensity data exceeds a threshold value. In accordance with an instruction to exclude the flagged light intensity data, the processing step processes the multiple event data items other than the flagged light intensity data.

BRIEF DESCRIPTION OF DRAWINGS

FIG. 1 is a flowchart describing processing example 1.

DESCRIPTION OF EMBODIMENTS

Figure 1:
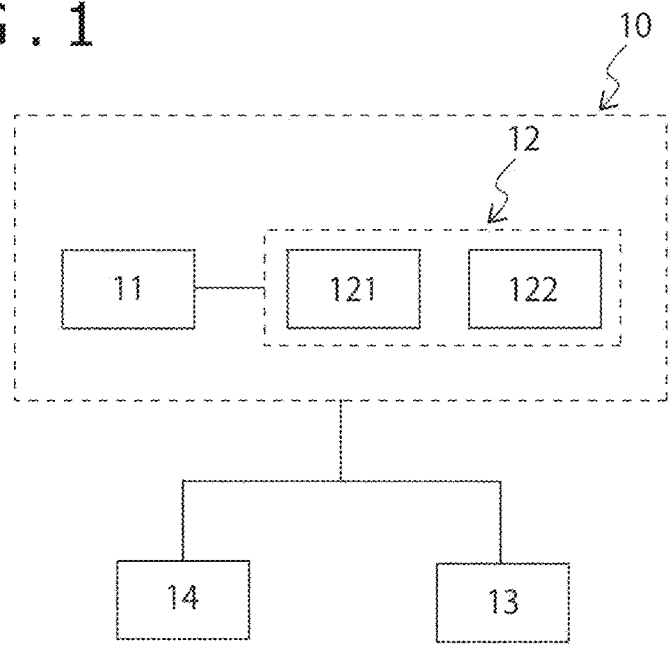
FIG. 1 is a schematic conceptual diagram depicting an embodiment example of an information processing apparatus according to the present technology.

Some preferred embodiments for implementing the present technology are described below.

Note that the embodiments explained hereunder are merely representative of how the present technology may be implemented and should not be interpreted restrictively in accordance therewith. The description of the technology will be made in the following order.

1. First embodiment (information processing apparatus)
  (1) Storage section 11
  (2) Processing section 12
  (3) User interface 13
  (4) Display section 14
  (5) Examples of processing by the processing section 12
    <Processing example 1>
    <Processing example 2>
    <Processing example 3>
    <Processing example 4>
    <Processing example 5>
2. Second embodiment (particle analysis apparatus)
  (1) Light irradiation section 21
  (2) Light detection section 22
  (3) Processing section 12
3. Third embodiment (particle fractionation apparatus)
(1) Fractionation Section 31
4. Fourth embodiment (information processing method)
1. First embodiment (information processing apparatus)

FIG. 1 is a schematic conceptual diagram depicting a first embodiment. An information processing apparatus 10 of this embodiment includes a storage section 11 and a processing section 12. The information processing apparatus 10 may further include other sections such as a user interface 13 and a display section 14 as needed.

(1) Storage Section 11

The storage section 11 stores event data including light intensity data obtained by irradiating light to one of multiple particles. The storage section 11 also stores a flag to be given to the light intensity data in a case of the light intensity data exceeds a threshold value.

With the present technology, "particles" refer in particular to microparticles, a type of which may be selected as desired. For the technology, the microparticles may include biological microparticles such as cells, clusters of cells, microbes and ribosomes, as well as synthetic microparticles including gel particles, beads, latex particles, polymer particles, and industrial particles.

The biological microparticles (also referred to as "biological particles") may include chromosomes, ribosomes, mitochondria, and organelles (cell organelles) including diverse cells. The cells may include animal cells (e.g., blood cells) and plant cells. In particular, the cells may be blood cells or tissue cells. The blood cells may be floating cells such as T-cells and B-cells. The tissue cells may be adherent cultured cells or adherent cells separated from tissues, for example. The clusters of cells may include spheroids and organoids for example. The microbes may include bacteria such as coli bacilli, viruses such as tobacco mosaic virus, and fungi such as yeast. The biological microparticles may further include biological macromolecules such as nucleic acids, proteins, and their composite bodies. These biological macromolecules may be either extracted from cells or included in blood samples or other liquid samples, for example.

The synthetic microparticles may be microparticles including organic or inorganic macromolecular materials or metals, for example. The organic macromolecular materials may include polystyrene, styrene-divinylbenzene, and polymethylmethacrylate. The inorganic macromolecular materials may include glass, silica, and magnetic materials. The metals may include gold colloids and aluminum. The synthetic microparticles may be gel particles or beads, for example. In particular, the synthetic microparticles may be gel particles or beads formed by at least one or more of oligonucleotide, peptide, protein, and enzyme in combination.

The particles may be spherical or substantially spherical, or non-spherical in shape. A size and a mass of the particles may be selected as desired. For the present technology, the particles may be provided with chemical or biological labels as needed, such as fluorescent dyes or fluorescent proteins. The labels to be provided may be selected as desired. The labels may be coupled with molecules (e.g., antibodies, aptamer, DNA, or RNA) that react specifically to the particles.

For the technology, the particles are preferably biological particles, or cells in particular.

The fluorescent dyes for labeling the particles are not limited to anything specific. At least one of known pigments for staining bioparticles may be utilized. For example, usable fluorescent dyes may include phycoerythrin (PE), fluorescein isothiocyanate (FITC), PE-Cy5, PE-Cy7, PE-TexasRed (registered trademark), allophycocyanin (APC), APC-Cy7, ethidium bromide, propidium iodide, Hoechst (registered trademark) 33258, Hoechst (registered trademark) 33342, DAPI (4'6-diamidino-2-phenylindole), acridine orange, chromomycin, mithramycin, olivomycin, pyronin Y, thiazole orange, rhodamine 101, isothiocyanate, BCECF, BCECF-AM, C.SNARF-1, C.SNARF-1-AMA, aequorin, Indo-1, Indo-1-AM, Fluo-3, Fluo-3-AM, Fura-2, Fura-2-AM, oxonol, TexasRed (registered trademark), rhodamine 123, 10-N-noni-acridine orange, fluorescein, fluorescein diacetate, carboxy fluorescein, carboxy fluorescein diacetate, carboxy dichlorofluorescein, and carboxy dichlorofluorescein diacetate. It is also possible to use derivatives of the above-listed fluorescent dyes.

In this embodiment, light intensity data is generated by getting light detectors to receive fluorescent or scattered light produced by irradiation of light to particles, and event data is generated on the basis of the light intensity data. In the case where the particles are labeled with a fluorescent dye, the light intensity data is generated by getting the light detectors to receive fluorescence emanating from the fluorescent dye excited by irradiation of light to the particles labeled with that fluorescent dye.

More specifically, upon receipt of fluorescent or scattered light, a light detector outputs an electrical signal corresponding to the received light, the output electrical signal being input to an analog-digital conversion circuit (analog-digital converter). The analog-digital conversion circuits are disposed downstream of (on the output side of) the light detectors and are connected therewith. The electrical signals are analog signals from photoelectric conversion by the light detectors detecting the light. Each analog-digital conversion circuit converts each input electrical signal from analog to digital form. Each analog-digital conversion circuit then outputs the digitized electrical signal to the downstream side.

The electrical signal output from each analog-digital conversion circuit is input to a data detection circuit. The data detection circuit is disposed downstream (on the output side) of each analog-digital conversion circuit and is connected therewith. The data detection circuit uses a particular one of the input electrical signals as a trigger signal for detecting a particle. That is, in the case where the value of the trigger signal meets predetermined conditions, the data detection circuit detects that each electrical signal has been detected from a particle. The data detection circuit reads the waveform of each input electrical signal, and generates light intensity data by calculating the parameters of the read-in waveform (width, height and area). Further, on the basis of each light intensity data item such as the value of each parameter of the calculated waveform, the data detection circuit generates event data associated with one particle corresponding to the light intensity data. In this embodiment, the storage section 11 stores the light intensity data and event data generated in such a manner described above.

According to the present technology, the storage section 11 stores the flag to be given to the light intensity data in the case where the light intensity data exceeds a threshold value as described above. Specifically, upon acquisition of a signal indicating that the light intensity data has exceeded the threshold value, the storage section 11 associates each light intensity data item with information indicating whether or not each light intensity data item has exceeded the threshold value. More specifically, the storage section 11 gives the flag to the light intensity data exceeding the threshold value and stores the flagged light intensity data.

The flag may be given, for example, in the case where an upper detection limit of the above light detector is exceeded upon detection thereby of light from the particle. More specifically, the flag is given in the case where an input voltage range of the above analog-digital conversion circuit is exceeded upon analog-to-digital conversion thereby of the signal from the light detector or where an upper limit of the capacity of holding data is exceeded when the digital signals are processed, for example.

The case where the upper limit of the capacity of holding data is exceeded during digital signal processing is, for example, a case where the upper limit of the data holding capacity, i.e., an upper limit that may be expressed in bit width, is exceeded. In that case, it is necessary to perform a process of removing (i.e., clipping) the excess portion. The flag may be given at the time of the clipping process.

The flag may also be given in the case where an upper limit of data processing is exceeded when the light intensity data is processed. More specifically, the flag may be given in the case where an upper limit of the capacity of holding the light intensity data is exceeded upon generation of the event data based on the light intensity data, or in the case where, upon transfer of the light intensity data or the event data from the information processing apparatus of the technology to a data analysis apparatus (e.g., personal computer or server), an upper limit of the data holding capacity for conversion to a data transfer format is exceeded.

In this embodiment, the event data may include multiple light intensity data items obtained by irradiating multiple light beams to the particle. In this case, the multiple light beams may be emitted from multiple light sources capable of irradiating excitation light beams with different wavelengths. In this embodiment, for example, light beams from multiple light sources may be irradiated to different positions so that the light from the particle may be detected by different light detectors to provide multiple light intensity data items.

(2) Processing Section 12

The processing section 12 processes multiple event data items acquired from the multiple particles. Also, in accordance with an instruction to remove the flagged light intensity data, the processing section 12 processes the multiple event data items preceding the flagged light intensity data.

Figure 2:
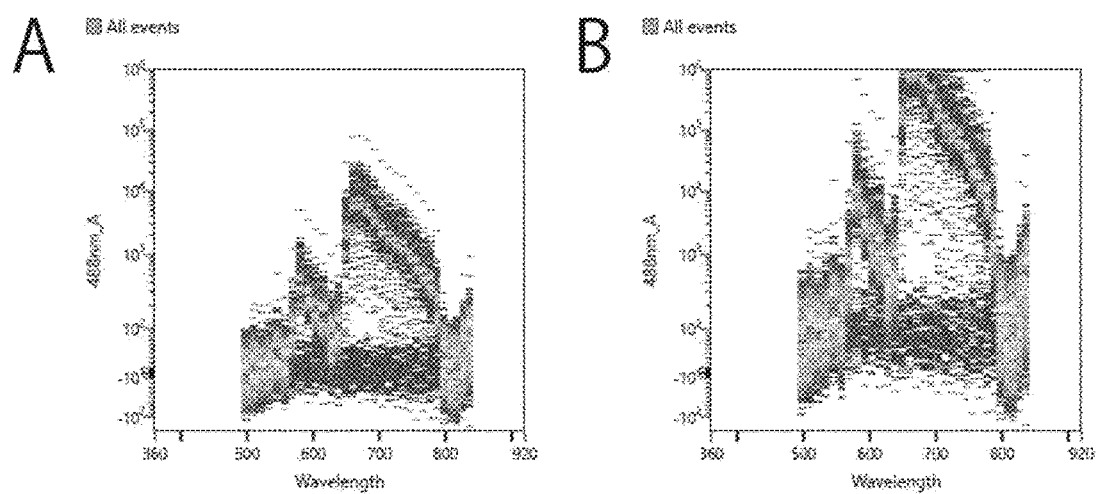
In FIG. 2, Subfigure A is a plot diagram depicting event data excluding light intensity data exceeding a predetermined threshold value, and Subfigure B is a plot diagram depicting event data including the light intensity data exceeding the predetermined threshold value.

In the case where there is detected the light intensity data exceeding the above threshold value upon analog-to-digital conversion of the signals from the light detectors, the existing apparatuses have no means to exclude the exceeding light intensity data. In FIG. 2, Subfigure A is a plot diagram depicting event data excluding the light intensity data exceeding the threshold value, and Subfigure B is a plot diagram depicting event data including the light intensity data exceeding the threshold value. The existing apparatuses are thus incapable of excluding the light intensity data exceeding the threshold value. Consequently, there has been no choice but to adjust the gain for measurement in a manner not exceeding the threshold value at the stage of data measurement.

Figure 3:
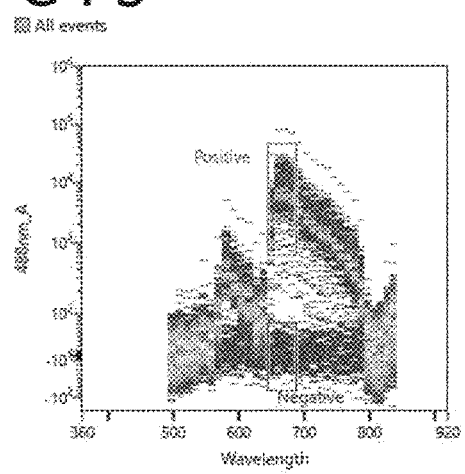
In FIG. 3, Subfigure A is a plot diagram in the case where the event data excluding the light intensity data exceeding the predetermined threshold value is gated, and Subfigure B is a plot diagram in the case where the event data including the light intensity data exceeding the predetermined threshold value is gated.
Figure 3:
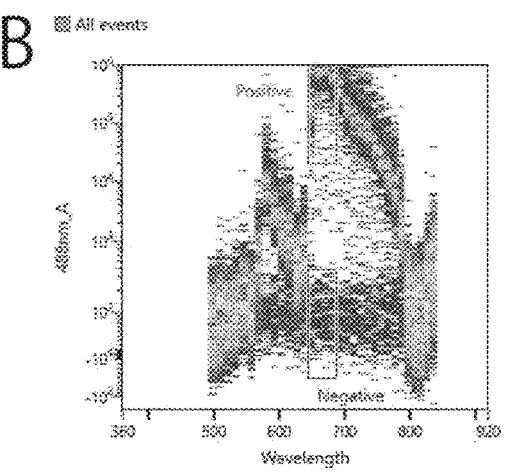

In FIG. 3, Subfigure A is a plot diagram in the case where the event data excluding the light intensity data exceeding the threshold value is gated, and Subfigure B is a plot diagram in the case where the event data including the light intensity data exceeding the threshold value is gated. In the case where there is event data including the light intensity data exceeding the threshold value at the stage of data analysis, the existing apparatuses thus have no choice but to permit a mixture of the light intensity data exceeding more or less the threshold value by creating a gate to exclude maximum-value data along each parameter axis plotting the measured data, for example.

Further, if there is a light detector having detected the light intensity data exceeding the threshold value, the data of the signal input to that light detector cannot be obtained accurately. In addition, the signals acquired from the other light detectors in the fluorescence compensation process are also affected. The result is a problem of declining reliability of data analysis.

According to the present technology, by contrast, the processing section 12 processes the multiple event data items other than the flagged light intensity data in accordance with the instruction to exclude the flagged light intensity data. The technology thus provides means to exclude the flagged light intensity data at the time of displaying, analyzing, or processing the acquired event data. The technology allows the data that can detract from the reliability of results to be excluded from the measured data as needed, thereby improving the reliability of data analysis.

More specifically, in the case of creating information for performing fluorescence compensation such as unmixing or compensation (e.g., spectral reference, compensation matrix, etc.), it is determined whether or not to exclude the flagged light intensity data. The data generated on the basis of the result of the determination is used to obtain data of higher reliability. Note that this process will be discussed later in "(5) Examples of processing by the processing section 12."

With this embodiment, in the case where the event data includes multiple light intensity data items obtained by irradiating multiple light beams to the particle, the processing section 12 may process the multiple event data items other than the event data including the flagged light intensity data in accordance with the instruction to exclude the flagged light intensity data.

In that case, the processing section 12 may include an arithmetic processing section 121 and an output processing section 122. The arithmetic processing section 121 calculates the ratio of the event data including the flagged light intensity data. The output processing section 122 also performs a process of outputting the ratio of the invent data including the flagged light intensity data and/or a process of outputting plot diagrams.

The arithmetic processing section 121 in this embodiment may calculate the ratio of the event data including the flagged light intensity data with respect to the event data (all event data) including a series of multiple light intensity data items obtained by irradiating multiple light beams to each of multiple particles, for example. Alternatively, the arithmetic processing section 121 may calculate the ratio of the event data including the flagged light intensity data with regard to multiple event data items included in a region gated on the plot diagram output by the output processing section 122, to be discussed later. These ratios, when calculated, provide indicators by which the user may determine whether or not to exclude the flagged light intensity data from all event data or from multiple event data items included in the region gated on the plot diagram, for example.

The output processing section 122 in this embodiment may further output the ratio of the event data including the flagged light intensity data from among multiple event data items obtained from the multiple particles targeted for analysis, for example. The ratio thus output provides an indicator by which the user may determine whether or not to exclude the flagged light intensity data, for example.

Figure 5:
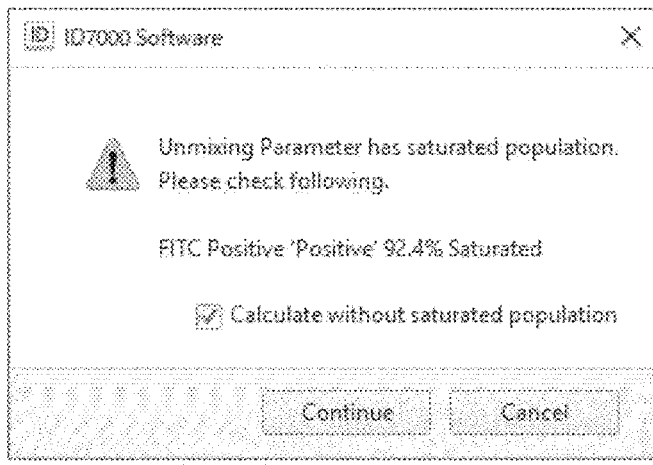
FIG. 5 is a diagram depicting a display example displayed by a display section outputting a ratio of the event data including the light intensity data provided with the above-mentioned flag.

Furthermore, the output processing section 122 may output the ratio of the event data including the flagged light intensity data to a display section 14, to be discussed later. FIG. 5 is a diagram depicting a display example displayed by the display section 14 outputting the ratio of the event data including the flagged light intensity data. In this case, by referencing the displayed ratio, the user may make an input via the user interface 13 to determine whether or not to exclude the flagged light intensity data.

In addition, the output processing section 122 may output a warning to the user in the case where the ratio of the event data including the flagged light intensity data has exceeded a threshold value. With the technology, the threshold value may be set as desired by the user. The warning may be either displayed on the display section 14, to be discussed later, or issued audibly, to alert the user.

The output processing section 122 in this embodiment may also output a plot diagram created for multiple event data items obtained from the multiple particles targeted for analysis. In this case, the above-mentioned arithmetic processing section 121 further calculates the ratio of the event data including the flagged light intensity data with respect to multiple event data items included in the region gated on the plot diagram.

Here, either the ratio of the event data including the flagged light intensity data may be output in a state displayed on the plot diagram by the output processing section 122, or only the ratio of the event data may be output on a different screen. For display on the plot diagram, the ratios of the event data with respect to the multiple event data items included in the gated region may be displayed on newly created child plot diagrams. The output permits evaluation of the reliability of the event data desired to be analyzed in detail by the user. This makes it possible to perform analysis with higher accuracy.

Also, the output processing section 122 in this embodiment may issue a warning to the user in the case where a threshold value is exceeded by the ratio of the event data including the flagged light intensity data with regard to the multiple event data items included in the gated region on the plot diagram. With the technology, the threshold value may be set as desired by the user. The warning may be either displayed on the display section 14, to be discussed later, or issued audibly, to alert the user.

The processing section 12 in this embodiment may perform a fractionation process on the particles associated with the multiple event data items other than the event data including the flagged light intensity data in accordance with the instruction to exclude the light intensity data with the flag. The process makes it possible selectively to fractionate only the particles having highly reliable data. Note that this process will be discussed later in "(1) Fractionation section 31."

Also, the processing section 12 in this embodiment may perform a process of switching between methods for displaying spectrum plots. The spectrum plot is a plot diagram in which the light intensity data obtained by irradiation of a single light beam are displayed in different wavelength bands of light detectors. For example, data may be color-coded when displayed according to the frequencies with which the event data including predetermined light intensity data is detected. In the case where multiple light beams are irradiated to the particle, a ribbon plot may be displayed in which the spectrum plots corresponding to the different light beams are arranged (see FIG. 4). More specifically, the process of switching between display methods involves switching from the method of displaying all light intensity data obtained through analysis in a color-coded manner according to their frequencies, to the method of not displaying the data having frequencies not exceeding a given threshold value.

Figure 4:
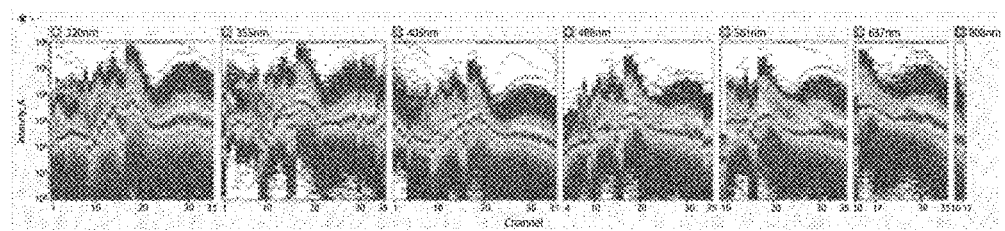
In FIG. 4, Subfigures A, B, and C are display examples of the plot diagrams.
Figure 4:
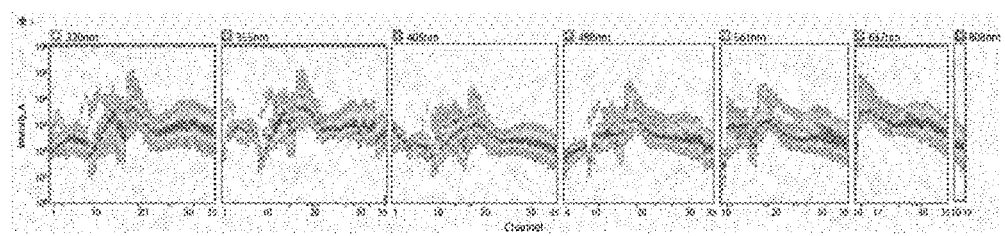
Figure 4:
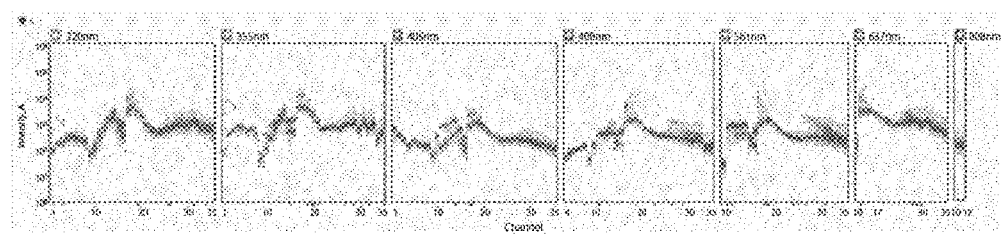

In FIG. 4, Subfigure A depicts a plot diagram displaying all event data in a color-coded manner according to their frequencies; Subfigure B depicts a plot diagram not displaying the data with frequencies not exceeding a predetermined threshold value; and Subfigure C depicts a plot diagram not displaying the data with frequencies not exceeding a threshold value set to be higher than that in Subfigure B. When the display method is switched in such a manner, it becomes easier to view a fluorescence spectrum waveform of a major population (e.g., single or multiple cell populations).

Also in this embodiment, the threshold value may be changed as desired by the user. Alternatively, a fixed threshold value may be set beforehand. In the case where the threshold value is changed as desired by the user, the user may either input a new threshold value, or select one of optional threshold values using a slider.

(3) User Interface 13

The user interface 13 permits input by the user. Via the user interface 13, the user may access and control components of the information processing apparatus of this embodiment. Note that for the technology, the user interface 13 is not mandatory and may be replaced with an externally connected operating device. For example, a mouse and a keyboard may be utilized as the user interface 13.

In this embodiment, the user may input and execute the instruction to exclude the flagged light intensity data via the user interface 13. The instruction to exclude the flagged light intensity data may be carried out via the user interface 13 as needed, not just when the output processing section 122 outputs the ratio of the event data including the flagged light intensity data or outputs a warning based on the ratio. For example, the instruction may be suitably executed by selecting a button or the like displayed on the screen.

(4) Display Section 14

The display section 14 may display, for example, the information output from the processing section 12, as well as all analysis-related matters generated by or output from any of the components of the apparatus. Note that, for the present technology, the display section 14 is not mandatory and may be replaced with an externally connected displayed device. For example, a display unit and a printer may be utilized as the display section 14.

(5) Examples of Processing by the Processing Section 12

Some examples of processing by the processing section 12 are described below with reference to the accompanying flowcharts.

Processing Example 1

Figure 6:
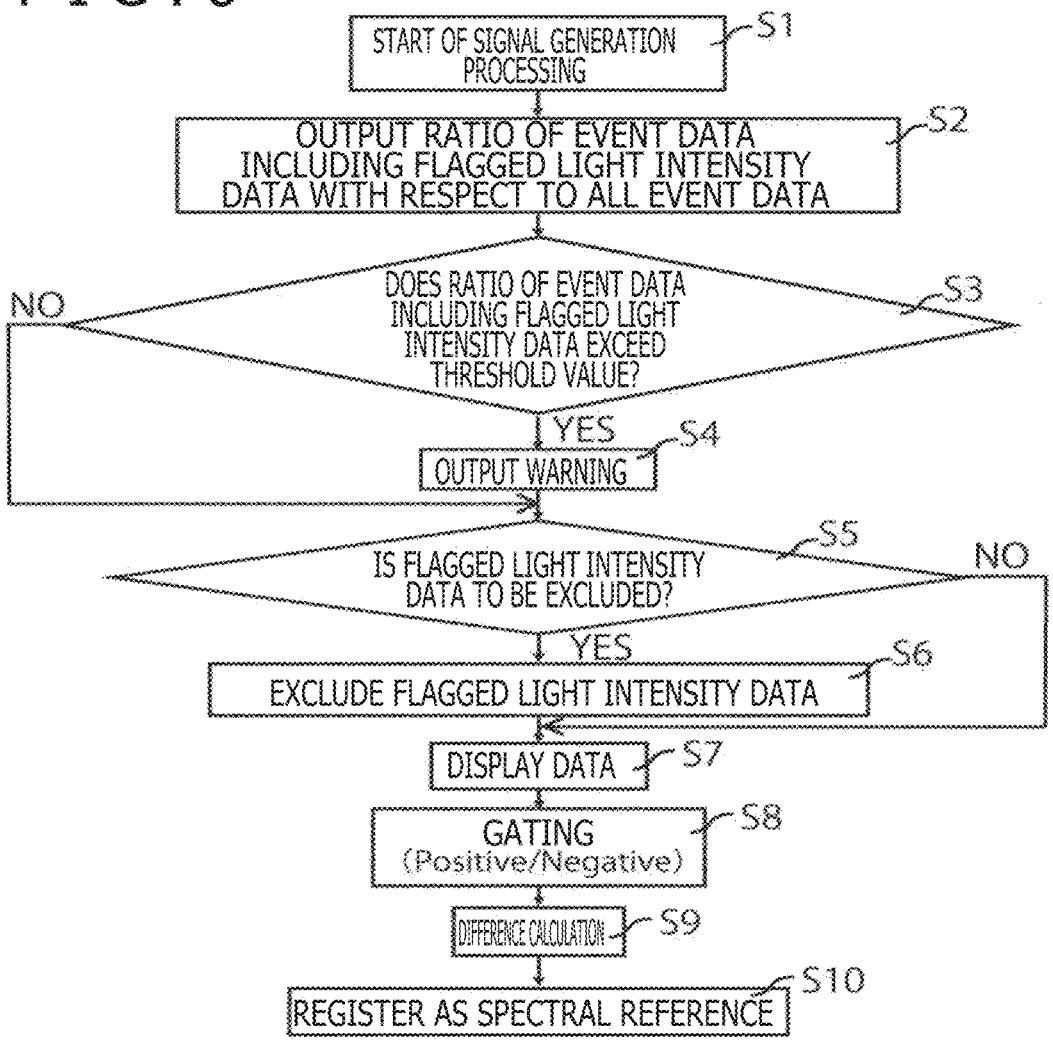

FIG. 6 is a flowchart describing processing example 1. The processing example 1 is a process for registration as a spectral reference. The spectral reference is formed by a simple stain spectrum, which is used in an unmixing process, for example. The simple stain spectrum is a fluorescence wavelength distribution of fluorescent dyes, i.e., the light intensity data obtained upon receipt by light detectors of the fluorescence emanating from the fluorescent dyes each labeling the particle being excited by irradiation of light thereto.

Unmixing is a fluorescence compensation method in which a particle labeled with multiple fluorescent dyes is multicolor-measured to provide a measurement spectrum for approximation by a linear sum of simple stain spectra using a weighted least-squares method (WLSM), in order to obtain the true light intensity data stemming from each fluorescent dye. Performing the unmixing process separates the spectrum information regarding overlapping fluorescent dyes into information regarding individual fluorescent dyes. It is then possible to isolate and analyze fluorescent reagents and fluorescent proteins, of which the fluorescence wavelength peaks are very similar to each other, highly accurately and in a highly repeatable manner.

First, the processing section 12 receives the flagged light intensity data (S1). Note that the light intensity data in this case is formed by the above-mentioned simple stain spectrum. The arithmetic processing section 121 then calculates the ratio of the event data including the flagged light intensity data with respect to the event data (all event data) including a series of multiple light intensity data items obtained, for example, by consecutively irradiating multiple light beams to each of multiple particles. The output processing section 122 outputs the calculated ratio (S2). At this point, in the case where the ratio exceeds a threshold value (S3), the output processing section 122 outputs a warning to the user (S4). It is then determined whether or not to exclude the flagged light intensity data (S5). Note that the determination may be made by the user. In this case, the user inputs instructions via the user interface 13.

Figure 7:
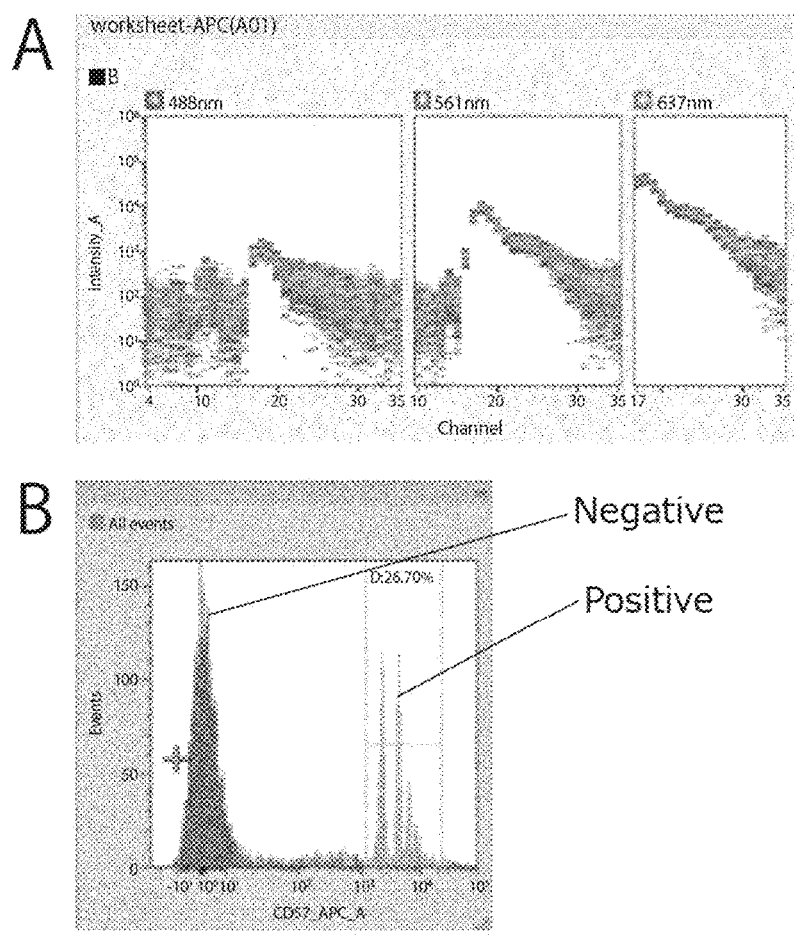
In FIG. 7, Subfigures A and B are diagrams depicting data display examples of processing examples 1 and 2.

In the case where it is determined that the flagged light intensity data is to be excluded (S5), the processing section 12 excludes the flagged light intensity data (S5), and provides data display (S7). The method of data display is not limited to anything specific; the data may be displayed, for example, in any of plot diagrams (including one-dimensional, two-dimensional, and three-dimensional plot diagrams), spectrograms, and histograms (including one-parameter histograms, two-parameter histograms (cytogram, dot plot), and three-parameter histograms) on the display section 14. Specifically, the output processing section 122 outputs a plot diagram created with respect to the multiple event data items other than the event data including the flagged light intensity data. Subfigures A and B in FIG. 7 are diagrams depicting data display examples of the processing example 1 and of processing example 2, to be discussed later. Subfigure A is a plot diagram of which the vertical axis represents light intensity and the horizontal axis stands for light detector channels. Subfigure B is a histogram of which the vertical axis represents the number of events and the horizontal axis stands for the light intensity at fluorescence wavelength peaks at which particles are labeled. On the other hand, in the case where it is determined that the flagged light intensity data is not to be excluded (S5), the processing section 12 provides the data display without excluding the flagged light intensity data (S7).

Of the displayed data, a positive population and a negative population are each gated (S8). Note that the gating process may be performed by the user. In this case, the user inputs instructions via the user interface 13. The processing section 12 then acquires a mean light intensity value of each of the positive and negative populations and performs difference processing thereon (S9). Finally, the data obtained as a result of the difference processing is registered as a spectral reference in the storage section 11 (S10).

Processing Example 2

Figure 8:
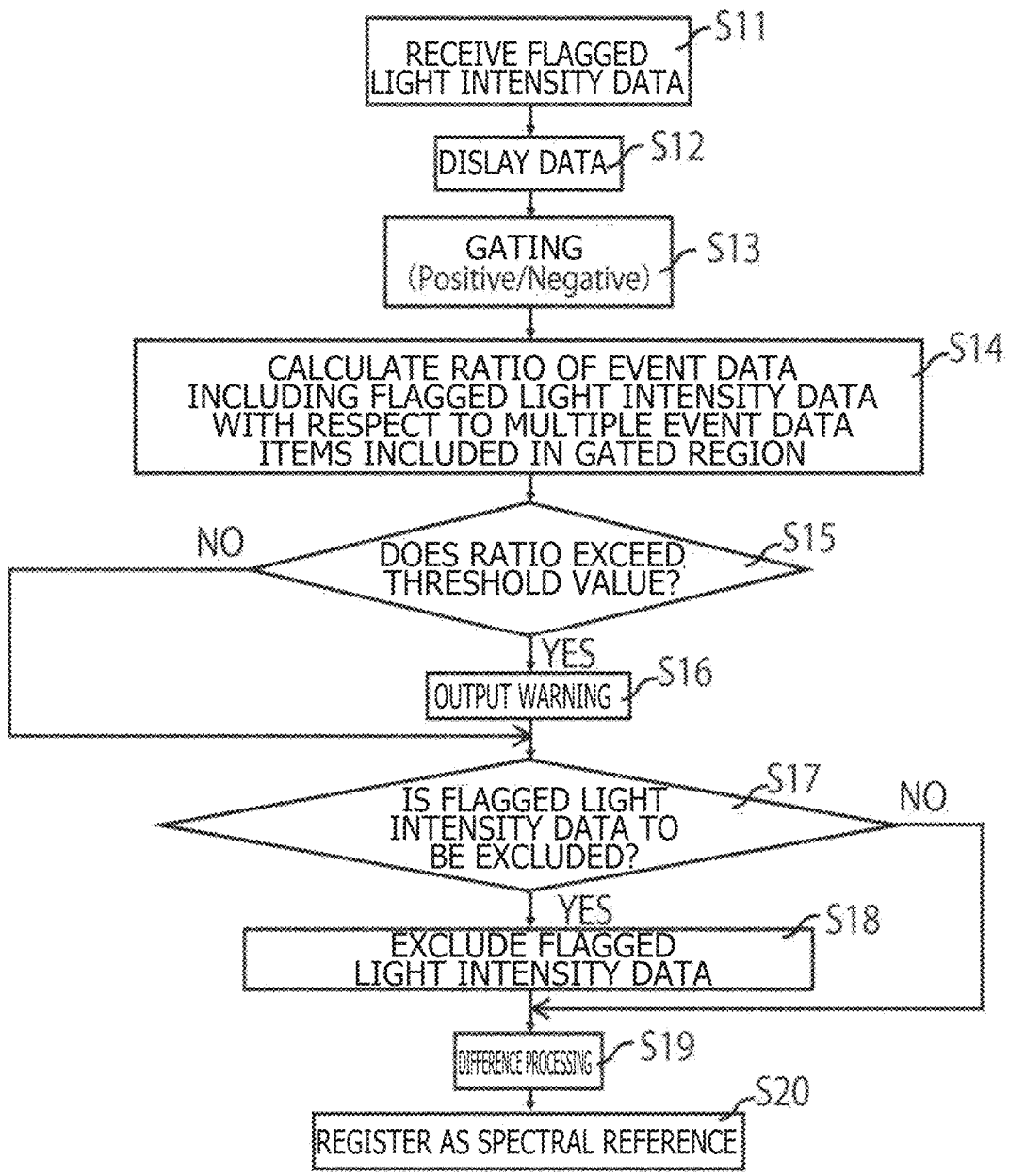
FIG. 8 is a flowchart describing the processing example 2.

FIG. 8 is a flowchart describing the processing example 2. As with the processing example 1, the processing example 2 is a process for registration as a spectral reference.

First, the processing section 12 receives the flagged light intensity data (S11). Note that the light intensity data in this case is formed by the above-mentioned simple stain spectrum. The processing section 12 then provides data display (S12). The method of data display is as described above. In this case, the output processing section 122 may output, for example, a plot diagram created with respect to the multiple event data items. Of the displayed data, a positive population and a negative population are each gated (S13). Note that the gating process may be performed by the user. In this case, the user inputs instructions via the user interface 13.

The arithmetic processing section 121 then calculates the ratio of the event data including the flagged light intensity data with regard to multiple event data items included in the gated region on the plot diagram output by the output processing section 122. The output processing section 122 outputs the calculated ratio (S14). At this point, in the case where the ratio exceeds a threshold value (S15), the output processing section 122 outputs a warning to the user (S16). It is then determined whether or not to exclude the flagged light intensity data (S17). Note that the determination may be made by the user. In this case, the user inputs instructions via the user interface 13.

In the case where it is determined that the flagged light intensity data is to be excluded (S17), the flagged light intensity data is excluded (S18). The processing section 12 then acquires a mean light intensity value of each of the positive and negative populations, and performs difference processing thereon (S19). Finally, the data obtained as a result of the difference processing is registered as a spectral reference in the storage section 11 (S20). On the other hand, in the case where it is determined that the flagged light intensity data is not to be excluded (S17), the processing section 12 performs the above difference processing without excluding the flagged light intensity data (S19), and registers the data resulting therefrom as a spectral reference in the storage section 11 (S20).

Processing Example 3

Figure 9:
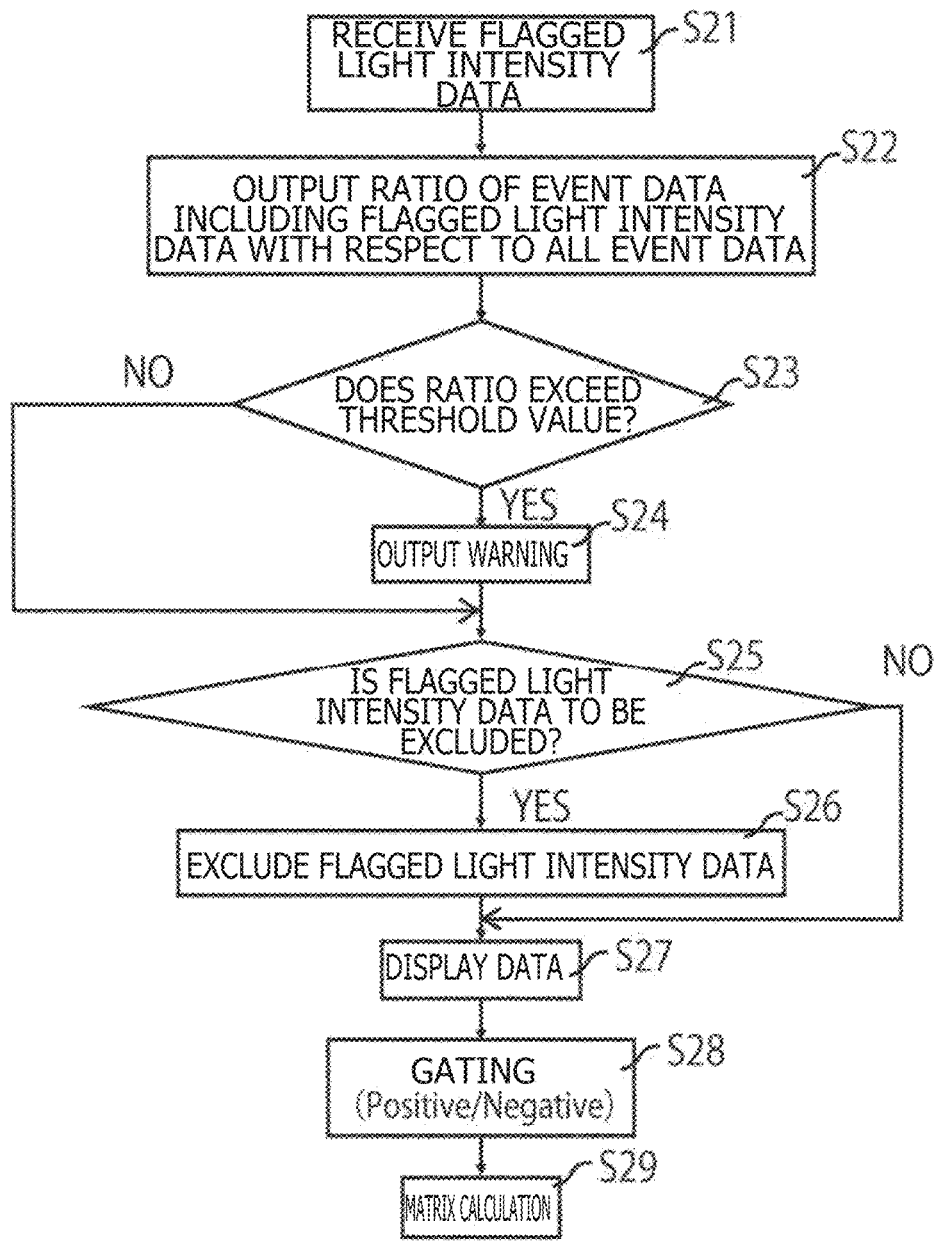
FIG. 9 is a flowchart describing processing example 3.

FIG. 9 is a flowchart describing processing example 3. The processing example 3 is a process in the case where compensation is carried out automatically. The compensation here involves compensating for leaking fluorescence. In the case of two-color measurement, for example, where two florescent light beams with their wavelengths overlapping with each other are measured, the method of compensation involves compensating the amounts of mutual leakage electrically or mathematically. The method of performing fluorescence compensation mathematically may involve, for example, expressing as a vector the fluorescence intensity measured by each light detector and applying to the vector the inverse matrix of a predetermined leakage matrix in order to calculate the true fluorescence intensity of the intended fluorescent dye. The leakage matrix, created by analyzing the above-mentioned simple stain spectrum, is an array of column vectors formed by a distribution of the fluorescence wavelengths of the fluorescent dyes involved.

First, the processing section 12 receives the flagged light intensity data (S21). Note that the light intensity data in this case includes the above simple stain spectrum. The arithmetic processing section 121 then calculates the ratio of the event data including the flagged light intensity data with respect to the event data (all event data) formed by a series of multiple light intensity data items obtained by consecutive irradiation of multiple light beams to each of multiple particles. The output processing section 122 outputs the calculated ratio (S22). At this point, in the case where the ratio exceeds a threshold value (S23), the output processing section 122 outputs a warning to the user (S24). It is then determined whether or not to exclude the flagged light intensity data (S25). Note that the determination may be made by the user. In this case, the user inputs instructions via the user interface 13.

In the case where it is determined that the flagged light intensity data is to be excluded (S25), the flagged light intensity data is excluded (S26). The processing section 12 then provides data display in accordance with the instruction to exclude the flagged light intensity data (S27). The method of data display is not limited to anything specific; the data may be displayed, for example, in any of plot diagrams (including one-dimensional, two-dimensional, and three-dimensional plot diagrams), spectrograms, and histograms (including one-parameter histograms, two-parameter histograms (cytogram, dot plot), and three-parameter histograms) on the display section 14. Also in this case, the output processing section 122 may output a plot diagram created with respect to the multiple event data items other than the event data including the flagged light intensity data, for example. On the other hand, in the case where it is determined that the flagged light intensity data is not to be excluded (S25), the processing section 12 provides the above data display without excluding the flagged light intensity data (S27).

Of the displayed data, a positive population and a negative population are each gated (S28). Note that the gating process may be performed by the user. In this case, the user inputs instructions via the user interface 13. Finally, the data obtained as a result of the gating process is used to perform matrix calculation (S29).

Processing Example 4

Figure 10:
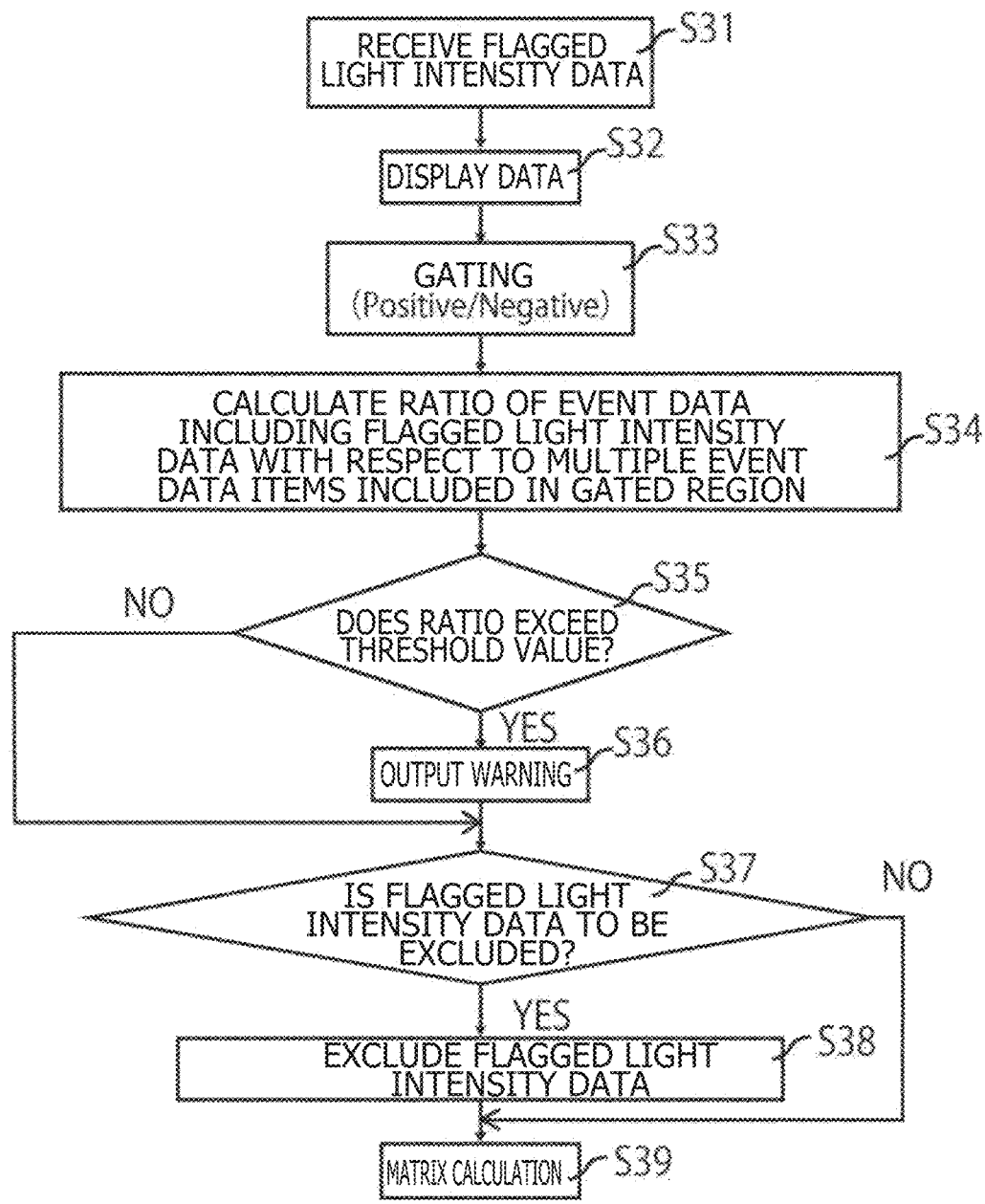
FIG. 10 is a flowchart describing processing example 4.

FIG. 10 is a flowchart describing processing example 4. As with the processing example 3, the processing example 4 is a process in the case where compensation is carried out automatically.

First, the processing section 12 receives the flagged light intensity data (S31). Note that the light intensity data in this case includes the above-mentioned simple stain spectrum. The processing section 12 then provides data display (S32). The method of data display is as described above. In this case, the output processing section 122 may output a plot diagram created with respect to the multiple event data items, for example. Of the displayed data, a positive population and a negative population are then gated each (S33). Note that the gating process may be performed by the user. In this case, the user inputs instructions via the user interface 13.

The arithmetic processing section 121 then calculates the ratio of the event data including the flagged light intensity data with respect to multiple event data items included in the gated region on the plot diagram output by the output processing section 122. The output processing section 122 outputs the calculated ratio (S34). In the case where the ratio exceeds a threshold value here (S35), the output processing section 122 outputs a warning to the user (S36). It is then determined whether or not to exclude the flagged light intensity data (S37). Note that the determination may be made by the user. In this case, the user inputs instructions via the user interface 13.

In the case where it is determined that the flagged light intensity data is to be excluded (S37), the flagged light intensity data is excluded (S38). Finally, the obtained data is used to perform matrix calculation (S39). On the other hand, in the case where it is determined that the flagged light intensity data is not to be excluded (S37), the processing section 12 performs matrix calculation by using the obtained data without excluding the flagged light intensity data (S39).

Processing Example 5

Figure 11:
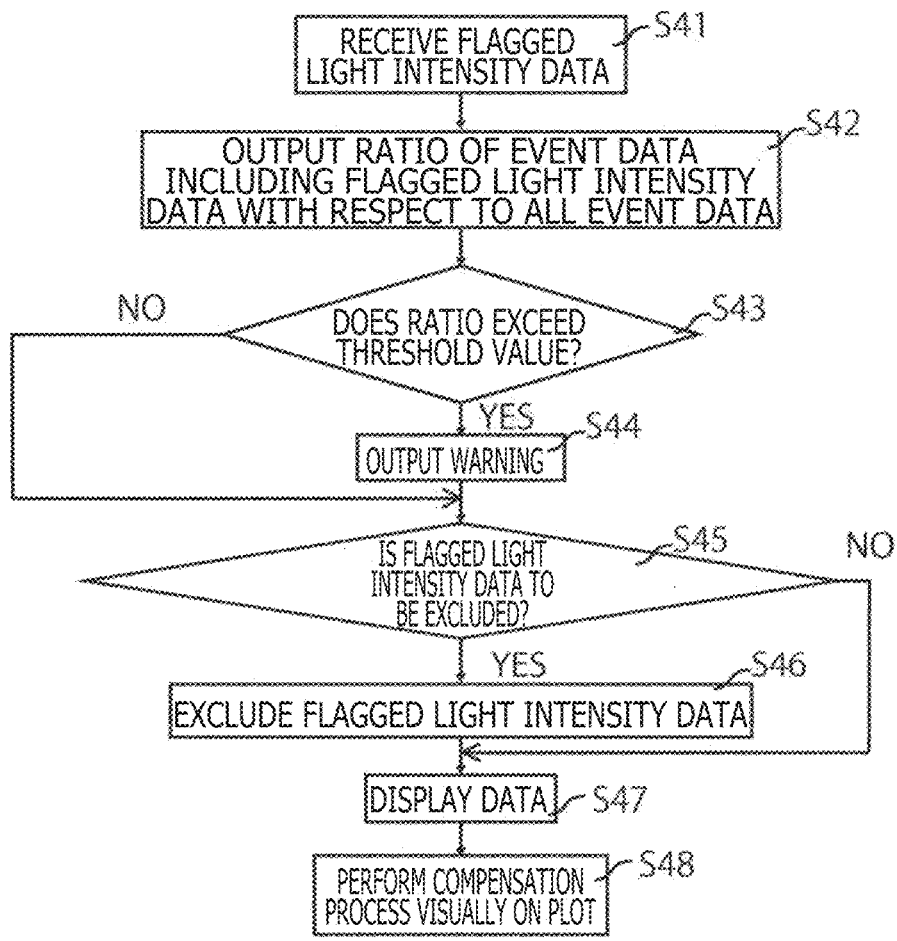
FIG. 11 is a flowchart describing processing example 5.

FIG. 11 is a flowchart describing processing example 5. The processing example 5 is a process in the case where the user performs compensation manually.

First, the processing section 12 receives the flagged light intensity data (S41). Note that the light intensity data in this case includes a measurement spectrum. The measurement spectrum refers to the light intensity data obtained by getting the light detectors to receive the fluorescence emanating from multiple fluorescent dyes excited by irradiation of light to the particle multiply-labeled with these fluorescent dyes having their fluorescence wavelengths overlapping with each other. The arithmetic processing section 121 then calculates the ratio of the event data including the flagged light intensity data with respect to the event data (all event data) formed by a series of multiple light intensity data items obtained by consecutive measurement of multiple particles. The output processing section 122 outputs the calculated ratio (S42). At this point, in the case where the ratio exceeds a threshold value (S43), the output processing section 122 outputs a warning to the user (S44). It is then determined whether or not to exclude the flagged light intensity data (S45). Note that the determination may be made by the user. In this case, the user inputs instructions via the user interface 13.

In the case where it is determined that the flagged light intensity data is to be excluded (S45), the flagged light intensity data is excluded (S46). The processing section 12 then provides data display in accordance with the instruction to exclude the flagged light intensity data (S47). The method of data display is not limited to anything specific; the data may be displayed, for example, in any of plot diagrams (including one-dimensional, two-dimensional, and three-dimensional plot diagrams), spectrograms, and histograms (including one-parameter histograms, two-parameter histograms (cytogram, dot plot), and three-parameter histograms) on the display section 14. Also in this case, the output processing section 122 may output a plot diagram created with respect to the multiple event data items other than the event data including the flagged light intensity data. On the other hand, in the case where it is determined that the flagged light intensity data is not to be excluded (S45), the processing section 12 provides the above data display without excluding the flagged light intensity data (S47). Finally, the user performs a correction process visually on the displayed data (S48).

2. Second Embodiment (Particle Analysis Apparatus)

Figure 12:
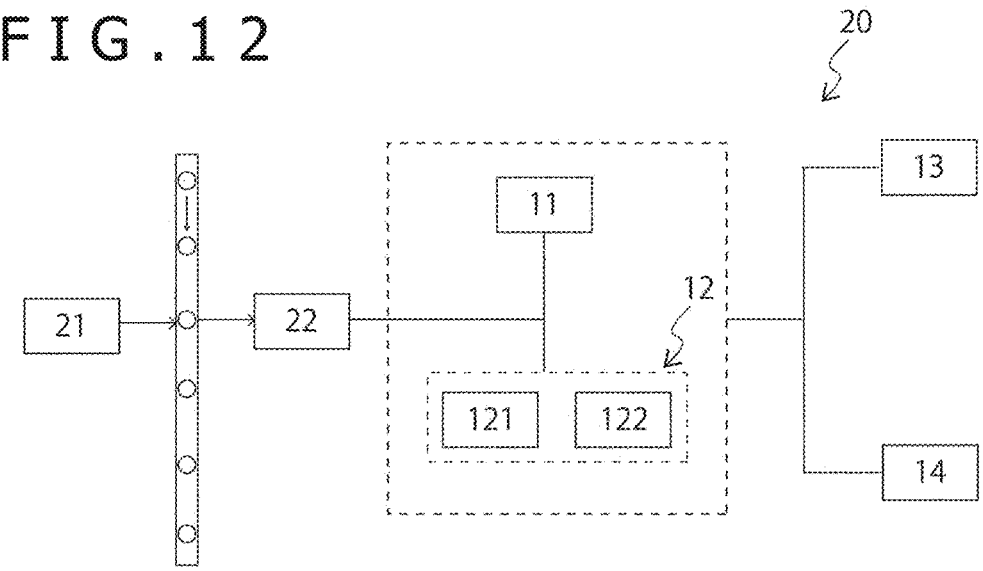
FIG. 12 is a schematic conceptual diagram depicting an embodiment example of a particle analysis apparatus according to the present technology.

FIG. 12 is a schematic conceptual diagram depicting a second embodiment. A particle analysis apparatus 20 of this embodiment includes a light irradiation section 21, a light detection section 22, a storage section 11, and a processing section 12. The particle analysis apparatus 20 may further include other sections such as a user interface 13 and a display section 14 as needed. In this embodiment, the storage section 11, the user interface 13, and the display section 14 are similar to those described above and thus will not be discussed here.

(1) Light Irradiation Section 21

The light irradiation section 21 irradiates light (e.g., excitation light) to one of multiple particles. The light irradiation section 21 may include a light source that emits excitation light and an object lens that focuses the excitation light onto the particle. A suitable light source may be suitably selected by those skilled in the art. For example, the light source may be a laser diode, an SHG laser, a solid-state laser, a gas laser, a high-luminance LED, or a combination of two or more of these devices. In addition to the light source and the objective lens, the light irradiation section 21 may include other optical elements. The light irradiation section 21 may irradiate light to a single position in an optical detection region, or to each of multiple positions therein, for example.

In this embodiment, the light irradiation section 21 may have a multiplicity of the above light sources so as to irradiation excitation light beams with different wavelengths.

(2) Light Detection Section 22

The light detection section 22 detects light from the single particle. More specifically, the light detection section 22 detects scattered light and/or fluorescence emanating from the particle irradiated by the light irradiation section 21. The light detection section 21 may include, for example, a light detector and a condenser lens that focuses the fluorescent and/or scattered light emanating from the particle. The light detector may be a PMT, a photodiode, a CCD, or a CMOS but is not limited thereto. As needed, the light detection section 22 may include other optical elements in addition to the condenser lens and the detector. For example, the light detection section 22 may further include a spectroscopic section. The optical parts including the spectroscopic section may be a grating, a prism, and an optical filter, for example. The spectroscopic section is capable of isolating and detecting the light of the wavelength to be detected from among the light beams of other wavelengths.

The fluorescence detected by the light detection section 22 may be fluorescence emanating from the particle itself or from a material (e.g., fluorescent material) labeled with microparticles, but is not limited thereto. The scattered light detected by the light detection section 22 may be forward-scattered light, side-scattered light, Rayleigh scattering, Mie scattering, or a combination of these light beams.

(3) Processing Section 12

In this embodiment, the processing section 12 may perform the following process in addition to those described above.

The processing section 12, connected with the light detection section 22, may analyze optical information detected thereby. More specifically, given the optical information (e.g., detected values of fluorescent or scattered light) regarding the light received from the light detection section 22, for example, the processing section 12 calculates the feature quantities of each particle that are representative of its size, form, and internal structure.

Note that, with the present technology, an external analysis apparatus or the like may be utilized for the analysis. Specifically, a personal computer or a CPU may be used to perform the analysis, store the results as a program into hardware resources equipped with recording media (e.g., nonvolatile memory (USB memory), HDD, CD) or the like, and allow the program to function. Furthermore, the external analysis apparatus may be connected with the components of the apparatus via a network.

3. Third Embodiment (Particle Fractionation Apparatus)

Figure 13:
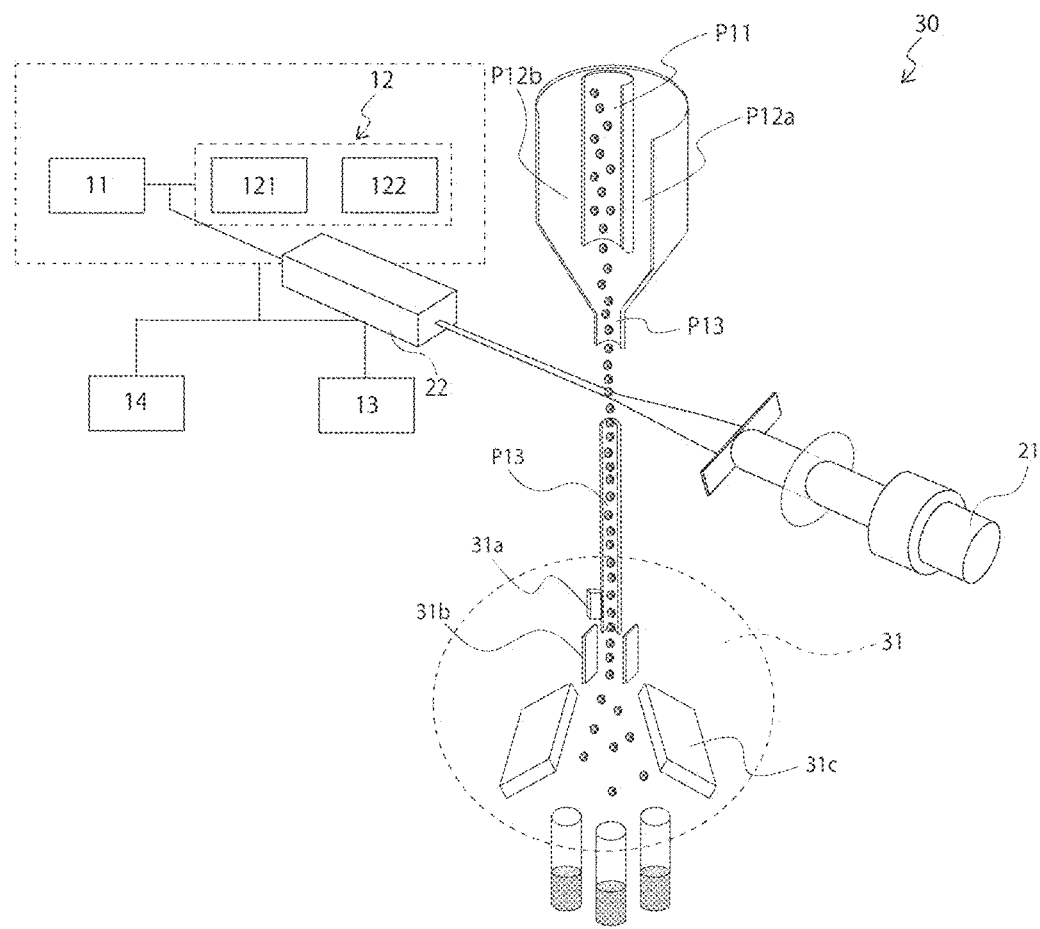
FIG. 13 is a schematic conceptual diagram depicting an embodiment example of a particle fractionation apparatus according to the present technology.
Figure 14:
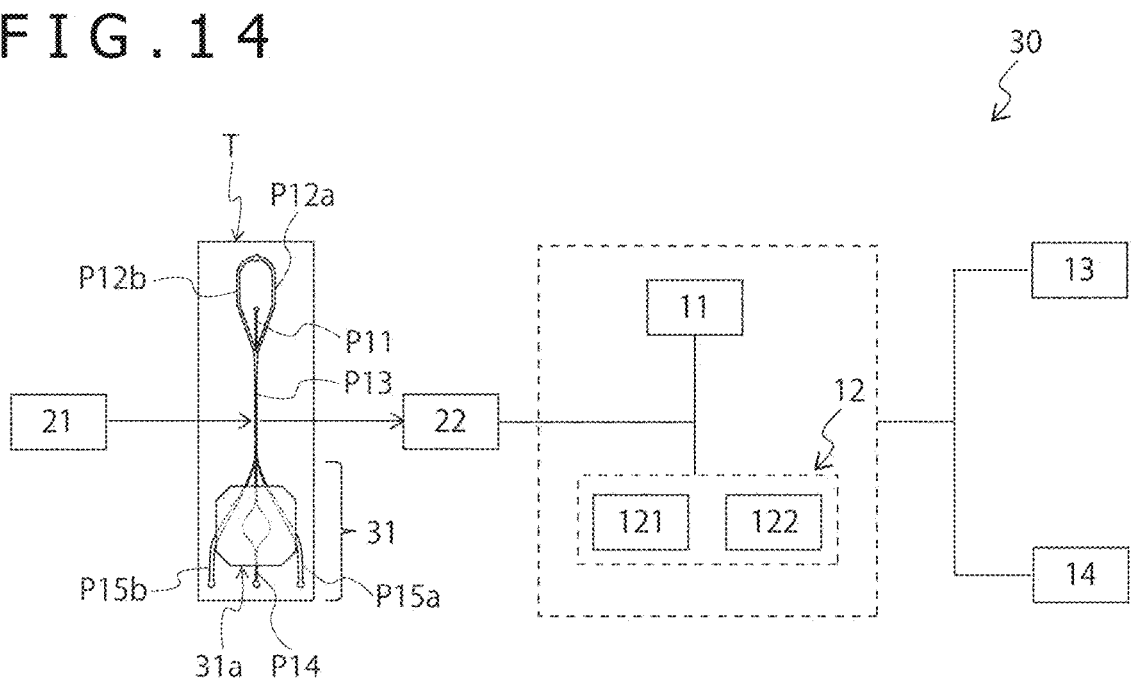
FIG. 14 is a schematic conceptual diagram depicting another embodiment example of the particle fractionation apparatus according to the present technology.

FIG. 13 is a schematic conceptual diagram depicting an example of a third embodiment. Furthermore, FIG. 14 is a schematic conceptual diagram depicting another example of the third embodiment. A particle fractionation apparatus 30 of this embodiment includes a light irradiation section 21, a light detection section 22, a storage section 11, a processing section 12, and a fractionation section 31. The particle fractionation apparatus 30 may further include other sections such as a user interface 13 and a display section 14 as needed. In this embodiment, the storage section 11, the processing section 12, the user interface 13, the display section 14, the light irradiation section 21, and the light detection section 22 are similar to those described above and thus will not be discussed further.

(1) Fractionation Section 31

The fractionation section 31 fractionates the particle based on the optical information detected by the light detection section 22. More specifically, the fractionation section 31 fractionates the particle downstream of flow passages P based on the results of analysis including the size, the form, and the internal structure of the particles from the optical intensity data, for example.

Below is a detailed description of the method of fractionation with reference to separate drawings.

The particle fractionation apparatus 30 in FIG. 13 vibrates all or part of a main flow passage P13 by using a vibration element 31a vibrating at a redetermined vibration frequency, causing a discharge outlet of the main flow passage P13 to discharge liquid droplets. Note that in this case, the vibration element 31a to be used is not limited to anything specific and may be selected as desired. For example, a piezoelectric vibration element may be utilized. Further, liquid droplets each having a fixed number of particles may be produced by regulating the droplet size through adjustment of the amount of liquid feed to a sample liquid flow passage P11, to sheath liquid flow passages P12a and P12b, and to the main flow passage P13, as well as through adjustment of the diameter of the discharge outlet and the vibration frequency of the vibration element.

Then, the liquid droplets are charged positively or negatively (see what is indicated by reference sign 31b in FIG. 13) in accordance with the results of analysis such as the size, the form, and the internal structure of the particle based on the optical information detected by the light detection section 22. The electrically charged liquid droplets have their course changed in a desired direction by opposite electrodes 31c to which a voltage is applied, so that the liquid droplets are fractionated.

Furthermore, in the particle fractionation apparatus 30 in FIG. 14, the sample liquid flow passage P1 and the sheath liquid flow passages P12a and P12b are formed on a substrate T. Three branch flow passages including a fractionation flow passage P14 and disposal flow passages P15a and P15b are provided downstream of the main flow passage P13. The particles determined to meet predetermined optical characteristics and targeted for fractionation are taken into the fractionation flow passage P14. The particles determined not to meet the predetermined optical characteristics are not taken into the fractionation flow passage P14 and are led into either of the two disposal flow passages P15a and P15b. This is how the fractionation is carried out.

Any known method may be used to take the particles targeted for fractionation into the fractionation passage P14. Alternatively, the vibration element 31a such as a piezoelectric element may be used to generate a negative pressure inside the fractionation passage P14, the negative pressure sucking a sample liquid and a sheath liquid including the fractionation-target particles into the fractionation flow passage P14. As another alternative, valve electromagnetic force, fluid stream (of gases or liquids), or the like may be used to control or change the laminar flow direction, thereby taking the fractionation-target particles into the fractionation flow passage P14.

In this embodiment, the fractionation section 31 fractionates the particles associated with the multiple event data items other than the event data including the light intensity data in accordance with the instruction to exclude the flagged light intensity data. This makes it possible selectively to fractionate only the particles having highly reliable data.

Specifically, before the start of sorting, the processing section 12 may perform a process of determining whether or not to perform fractionation based on the setting of whether or not to let the fractionation section 31 fractionate the particle associated with the event data including the flagged light intensity data. For example, in the case where, at the time of sorting, there is the setting of "not fractionating" the particle associated with the event data including the flagged light intensity data, the flow may be arranged so that the events inside the gate targeted for sorting will not be sorted.

In this embodiment, the setting may be made prior to the start of sorting. The setting may alternatively be made by the user via the user interface 13. Also with the present technology, it is possible to display, via the output processing section 122, the ratio of the event data including the flagged light intensity data with respect to all event data or the event data targeted for sorting. On the basis of the displayed results, the user can determine whether or not to exclude the event data including the flagged light intensity data.

4. Fourth Embodiment (Information Processing Method)

An information processing method of this embodiment includes a storing step and a processing step. Other steps may be included in the method as needed. The method performed in the storing step is similar to that carried out by the storage section 11, and the method executed in the processing step is similar to that conducted by the processing section 12. These methods will thus not be discussed further.

Note that the present technology may be implemented preferably in the following configurations.

(1)

An information processing apparatus including:

a storage section configured to store event data including light intensity data obtained by irradiating light to one of a plurality of particles; and a processing section configured to process a plurality of event data items acquired from the plurality of particles, in which the storage section stores a flag to be given to the light intensity data in a case where the light intensity data exceeds a threshold value, and, in accordance with an instruction to exclude the flagged light intensity data, the processing section processes the plurality of event data items other than the flagged light intensity data.

(2)

The information processing apparatus according to (1), in which the flag is given in a case where an upper detection limit of a light detector detecting light from the particle is exceeded and/or where an upper processing limit of capacity to process data is exceeded at the time of processing the light intensity data.

(3)

The information processing apparatus according to (2), in which the flag is given in a case where, upon analog-to-digital conversion of a signal from the light detector, an input voltage range of the analog-to-digital conversion is exceeded.

(4)

The information processing apparatus according to (2), in which the flag is given in a case where an upper limit of capacity to hold data is exceeded at the time of processing a digital signal.

(5)

The information processing apparatus according to (2), in which the flag is given in a case where an upper limit of the capacity to process data is exceeded at the time of processing the light intensity data.

(6)

The information processing apparatus according to any one of (1) to (5), in which the instruction is input by a user via a user interface.

(7)

The information processing apparatus according to (1), in which the event data includes a plurality of light intensity data items obtained by irradiating a plurality of light beams to the particle, and, in accordance with the instruction to exclude the flagged light intensity data, the processing section processes the plurality of event data items other than the event data including the light intensity data.

(8)

The information processing apparatus according to (7), in which the processing section outputs a ratio of the event data including the flagged light intensity data.

(9)

The information processing apparatus according to (7) or (8), in which, in accordance with the instruction to exclude the flagged light intensity data, the processing section outputs a plot diagram created with regard to the plurality of event data items other than the event data including the flagged light intensity data.

(10)

The information processing apparatus according to (8), in which, in a case where the ratio exceeds a threshold value, the processing section outputs a warning to a user.

(11)

The information processing apparatus according to any one of (7) to (10), in which, in accordance with the instruction to exclude the flagged light intensity data, the processing section performs a fractionation process on the particle associated with the plurality of event data items other than the event data including the light intensity data.

(12)

The information processing apparatus according to (7), in which the processing section outputs a plot diagram created with regard to the plurality of event data items.

(13)

The information processing apparatus according to (12), in which the processing section calculates a ratio of the event data including the flagged light intensity data with respect to a plurality of event data items included in a gated region on the plot diagram.

(14)

The information processing apparatus according to (13), in which, in a case where the ratio exceeds a threshold value, the processing section outputs a warning to a user.

(15)

A particle analysis apparatus including:

a light irradiation section configured to irradiate light to one of a plurality of particles;

a light detection section configured to detect light from the particle;

a storage section configured to store event data including light intensity data obtained from the light detection section; and a processing section configured to process a plurality of event data items acquired from the plurality of particles, in which the storage section stores a flag to be given to the light intensity data in a case where the light intensity data exceeds a threshold value, and in accordance with an instruction to exclude the flagged light intensity data, the processing section processes the plurality of event data items other than the flagged light intensity data.

(16)

A particle fractionation apparatus including:

a light irradiation section configured to irradiate light to one of a plurality of particles;

a light detection section configured to detect light from the particle;

a storage section configured to store event data including light intensity data obtained from the light detection section; and a processing section configured to process a plurality of event data items acquired from the plurality of particles, in which the storage section stores a flag to be given to the light intensity data in a case where the light intensity data exceeds a threshold value, in accordance with an instruction to exclude the flagged light intensity data, the processing section processes the plurality of event data items other than the flagged light intensity data, and, a fractionation section is further provided to fractionate, in accordance with the instruction to exclude the flagged light intensity data, the particle associated with the plurality of event data items other than the event data including the light intensity data.

(17)

An information processing method including:
  a step of storing event data including light intensity data obtained by irradiating light to one of a plurality of particles; and
  a step of processing a plurality of event data items acquired from the plurality of particles, in which
  the storing step stores a flag to be given to the light intensity data in a case where the light intensity data exceeds a threshold value, and,
  in accordance with an instruction to exclude the flagged light intensity data, the processing step processes the plurality of event data items other than the flagged light intensity data.

REFERENCE SIGNS LIST

10: Information processing apparatus
11: Storage section
12: Processing section
121: Arithmetic processing section
122: Output processing section
13: User interface
14: Display section
20: Particle analysis apparatus
21: Light irradiation section
22: Light detection section
30: Particle fractionation apparatus
31: Fractionation section

The invention claimed is:

1. An information processing apparatus comprising:
  a storage section configured to store event data including light intensity data obtained by irradiating light to one of a plurality of particles; and
  a processing section configured to process a plurality of event data items acquired from the plurality of particles, wherein
  the storage section stores a flag to be given to the light intensity data in a case where the light intensity data exceeds a threshold value, and,
  in accordance with an instruction to exclude the flagged light intensity data, the processing section processes the plurality of event data items other than the flagged light intensity data.

2. The information processing apparatus according to claim 1, wherein the flag is given in a case where an upper detection limit of a light detector detecting light from the particle is exceeded and/or where an upper processing limit of capacity to process data is exceeded at the time of processing the light intensity data.

3. The information processing apparatus according to claim 2, wherein the flag is given in a case where, upon analog-to-digital conversion of a signal from the light detector, an input voltage range of the analog-to-digital conversion is exceeded.

4. The information processing apparatus according to claim 2, wherein the flag is given in a case where an upper limit of capacity to hold data is exceeded at the time of processing a digital signal.

5. The information processing apparatus according to claim 2, wherein the flag is given in a case where an upper limit of the capacity to process data is exceeded at the time of processing the light intensity data.

6. The information processing apparatus according to claim 1, wherein the instruction is input by a user via a user interface.

7. The information processing apparatus according to claim 1, wherein
  the event data includes a plurality of light intensity data items obtained by irradiating a plurality of light beams to the particle, and,
  in accordance with the instruction to exclude the flagged light intensity data, the processing section processes the plurality of event data items other than the event data including the light intensity data.

8. The information processing apparatus according to claim 7, wherein the processing section outputs a ratio of the event data including the flagged light intensity data.

9. The information processing apparatus according to claim 7, wherein, in accordance with the instruction to exclude the flagged light intensity data, the processing section outputs a plot diagram created with regard to the plurality of event data items other than the event data including the flagged light intensity data.

10. The information processing apparatus according to claim 8, wherein, in a case where the ratio exceeds a threshold value, the processing section outputs a warning to a user.

11. The information processing apparatus according to claim 7, wherein, in accordance with the instruction to exclude the flagged light intensity data, the processing section performs a fractionation process on the particle associated with the plurality of event data items other than the event data including the light intensity data.

12. The information processing apparatus according to claim 7, wherein the processing section outputs a plot diagram created with regard to the plurality of event data items.

13. The information processing apparatus according to claim 12, wherein the processing section calculates a ratio of the event data including the flagged light intensity data with respect to a plurality of event data items included in a gated region on the plot diagram.

14. The information processing apparatus according to claim 13, wherein, in a case where the ratio exceeds a threshold value, the processing section outputs a warning to a user.

15. A particle analysis apparatus comprising:
  a light irradiation section configured to irradiate light to one of a plurality of particles;
  a light detection section configured to detect light from the particle;
  a storage section configured to store event data including light intensity data obtained from the light detection section; and
  a processing section configured to process a plurality of event data items acquired from the plurality of particles, wherein
  the storage section stores a flag to be given to the light intensity data in a case where the light intensity data exceeds a threshold value, and,
  in accordance with an instruction to exclude the flagged light intensity data, the processing section processes the plurality of event data items other than the flagged light intensity data.

16. A particle fractionation apparatus comprising:
  a light irradiation section configured to irradiate light to one of a plurality of particles;
  a light detection section configured to detect light from the particle;
  a storage section configured to store event data including light intensity data obtained from the light detection section; and a processing section configured to process a plurality of event data items acquired from the plurality of particles, wherein the storage section stores a flag to be given to the light intensity data in a case where the light intensity data exceeds a threshold value, in accordance with an instruction to exclude the flagged light intensity data, the processing section processes the plurality of event data items other than the flagged light intensity data, and a fractionation section is further provided to fractionate, in accordance with the instruction to exclude the flagged light intensity data, the particle associated with the plurality of event data items other than the event data including the light intensity data.

17. An information processing method comprising:

a step of storing event data including light intensity data obtained by irradiating light to one of a plurality of particles; and a step of processing a plurality of event data items acquired from the plurality of particles, wherein the storing step stores a flag to be given to the light intensity data in a case where the light intensity data exceeds a threshold value, and, in accordance with an instruction to exclude the flagged light intensity data, the processing step processes the plurality of event data items other than the flagged light intensity data.

* * * * *